United States Patent
Morris (10) Patent No.: US 7,451,185 B2
(45) Date of Patent: Nov. 11, 2008

(54) METHOD AND SYSTEM FOR PROVIDING LINKS TO RESOURCES RELATED TO A SPECIFIED RESOURCE

(75) Inventor: Robert Paul Morris, Raleigh, NC (US)

(73) Assignee: Fotomedia Technologies, LLC, Portsmouth, NH (US)

( * ) Notice: Subject to any disclaimer, the term of this patent is extended or adjusted under 35 U.S.C. 154(b) by 463 days.

(21) Appl. No.: 10/788,613

(22) Filed: Feb. 27, 2004

(65) Prior Publication Data

US 2005/0192940 A1   Sep. 1, 2005

(51) Int. Cl.
  *G06F 15/16* (2006.01)
  *G06F 17/30* (2006.01)
  *G06F 3/048* (2006.01)
(52) U.S. Cl. .................. 709/206; 707/3; 715/847
(58) Field of Classification Search .......... 709/206, 709/207, 217, 246; 707/3, 4, 5; 382/224; 715/847
See application file for complete search history.

(56) References Cited

U.S. PATENT DOCUMENTS

| | | | |
|---|---|---|---|
| 6,351,556 B1 * | 2/2002 | Loui et al. | 382/164 |
| 6,484,162 B1 * | 11/2002 | Edlund et al. | 707/3 |
| 6,816,858 B1 * | 11/2004 | Coden et al. | 707/5 |
| 7,007,294 B1 * | 2/2006 | Kurapati | 707/3 |
| 7,035,467 B2 * | 4/2006 | Nicponski | 382/224 |
| 2002/0008622 A1 * | 1/2002 | Weston et al. | 340/572.1 |
| 2002/0120620 A1 * | 8/2002 | Chan et al. | 707/3 |
| 2003/0128877 A1 * | 7/2003 | Nicponski | 382/224 |
| 2004/0100566 A1 * | 5/2004 | Valleriano et al. | 348/231.99 |
| 2005/0111737 A1 * | 5/2005 | Das et al. | 382/224 |
| 2005/0131992 A1 * | 6/2005 | Goldstein et al. | 709/202 |

* cited by examiner

*Primary Examiner*—Paul H Kang (57) ABSTRACT

The present invention is related to a computer-implemented method and system for providing links to one or more resources related to a specified resource. The method according to the present invention includes allowing a user to configure a relation comprising a matching criteria for the resource, associating the relation with the specified resource, and processing the relation to create a relation set comprising the links to the one or more related resources satisfying the matching criteria.

48 Claims, 12 Drawing Sheets

METHOD AND SYSTEM FOR PROVIDING LINKS TO RESOURCES RELATED TO A SPECIFIED RESOURCE

FIELD OF THE INVENTION

The present invention relates to networked communications, and more particularly to, a method and system for providing links to resources related to a specified resource.

BACKGROUND OF THE INVENTION

Online web photo albums have attained a significant degree of popularity both through personal websites, online photo-sharing sites, and peer-to-peer photo-sharing networks. Typically, a user uploads or downloads digital images and albums to his or her personal website, photo-sharing site, or personal computer, which also store other resources, such as user sites, electronic greeting cards, electronic books, movies, music, etc. (collectively referred to as "resources"). Typically, the resources are presented in either a disjoint state or the relationships presented between the resources are static. For example, if a user wished to browse photo albums that contain pictures taken on a given date, the user could not follow a set of links from one album to another that meets this criteria. In other words, there is no "web" of albums containing pictures taken on a specified date.

A user who is interested in accessing a resource at a site, e.g., viewing an image, or an album containing images, typically clicks on the link to the resource, which opens the resource. Some sites provide links to a fixed subset of related resources. This subset of related resources often is not the subset the resource owner wishes to make available and might not be the subset that a visitor is interested in locating. If the user is interested in accessing resources related to an opened resource beyond the subset provided, but does not know if such related resources exist and/or does not know the respective links if they do exist, the user is required to perform a site search. If such a function is supported by the site, the user must enter various search criteria to the site, which then retrieves a list of resources and their links that satisfy the search criteria.

Crafting an appropriate search criteria in order to retrieve relevant information is a difficult task and depends on the user's skills and on the site's search engine. For example, if the search criteria is too broad, the search engine will return data that, while satisfying the query, is irrelevant to the user's needs. To address this, certain search engines provide the user with a variety of fixed search criteria from which the user may select. For example, in a conventional social networking website, the user is interested in retrieving information about other people with similar interests. These services allow a user to traverse a fixed subset of relationships which exists among the users of the service. For example, a user can traverse from one user page to find the pages of other users that are related by gender, marital status, or some other supported criteria. The criteria available are not under the control of the owner of the page or the viewer of the page.

While the burden of formulating a query is lifted from the user, the ability for the user to craft a query closely reflecting his or her interests is greatly limited because the search engine only provides limited search criteria. In the above example, the user would not be allowed to specify a preference for individuals who share an interest in football or orchids for example.

Accordingly, a need exists for a system and method that allows a user to specify relationships between and among resources stored at a site. Moreover, the system and method should automatically provide links to and between related resources such that the user can easily navigate to such related resources. The present invention addresses such a need.

SUMMARY OF THE INVENTION

The present invention is related to a method and system for providing links to one or more resources related to a specified resource. The method according to the present invention includes configuring by a user a relation comprising a matching criteria for the specified resource, associating the relation with the specified resource, and processing the relation to create a relation set comprising the links to the one or more related resources satisfying the matching criteria.

Through aspects of the present invention, the user is allowed to configure one or more relationships to associate with a resource. Each configured relationship includes one or more constraints, which collectively form the matching criteria. When the matching criteria is executed by a search engine, links to the resources that satisfy the matching criteria are created and displayed to the user who can then use the links to navigate to the related resources. Advantageously, the user is allowed to control the type of resource sought, (i.e., whether the resource to be returned is an image or an album), who has access to the links, and the dynamic nature of the links, (i.e., when or how often the matching criteria is executed).

DETAILED DESCRIPTION OF THE INVENTION

The present invention relates to networked communications, and more particularly to, a method and system for providing links between a resource and a collection of related resources. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, while the preferred embodiment is described with respect to photo-sharing, the principles described can also be applied to any resource, such as songs, movie clips, user sites, and the like. Thus, the present invention is not intended to be limited to the embodiment shown but is to be accorded the widest scope consistent with the principles and features described herein.

According to a preferred embodiment of the present invention, a user of a photo-sharing website is allowed to automatically discover and manually specify relationships among resources, e.g., images, albums, and users, which enables the site to provide links to related resources. The links depend on the type of relationship that the user wishes to make available for others or on the type of relationship that the user is interested in. Unlike conventional applications, the present invention provides great flexibility to the user in defining the type of relationship between the specified resource and the related resources. The user is not limited to static categories defined by the system, but rather is free to create constraints from parameters associated with the types of resources sought.

Examples of the types of relationships which are supported include, but are not limited to:

A relationship that defines resources related to a viewer of a current resource. For instance, when viewing the current resource, the visitor is provided links to other resources visited or owned by previous visitors, or to other resources that previous visitors have specified are related to the current resource.

A relationship defined by common keywords for the resources. For example, such a relationship provides links to resources where at least 'x' keywords have matching values, or to resources owned by people with the same last name, who are members in some specified list or group, have home addresses with the same zip code, have phone numbers that are in the same area code, who work for the same company, who attend the same church, who attended the same school, etc.

Figure 1:
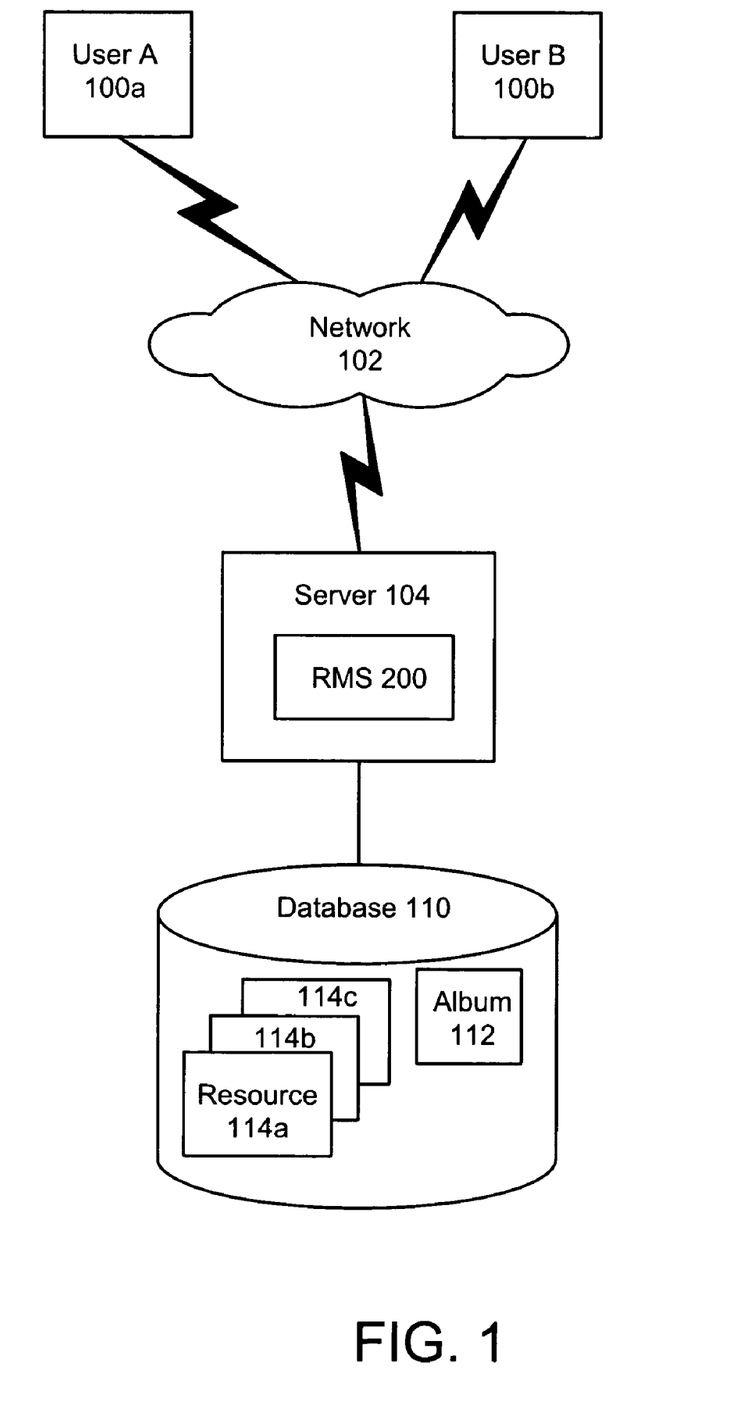
FIG. 1 is a block diagram illustrating a client-server environment in which the preferred embodiment of the present invention may be implemented.

FIG. 1 is a block diagram illustrating a client-server environment in which the preferred embodiment of the present invention may be implemented. The client-server system depicted includes a plurality of users 100a, 100b coupled to a server 104 via a private or public network 102, such as a LAN, WAN or the Internet. The server 104 may support an on-line photo sharing website or may it may host personal websites. Typically, a first user, e.g., User A 100a, uploads a resource, e.g., an album 112 including a group of digital images, to the server 104, and the server 104 places the album 112 in storage, e.g., a database 110. When User A 100a wishes to share the album 112 with a second user, e.g., User B 100b, the server 104 provides a link, such as a URL, associated with the album 112 to User A 110a. User A 100a can then invite User B 100b to view the album 112 by providing the link to User B 100b.

In the preferred embodiment, a "resource" refers to any entity that can be categorized. For example, types of resources include images, albums, songs, user sites, websites, individuals, books and documents. Typically, the server 104 stores a plurality of resources 114a-114c for the plurality of users 100a, 100b. Each resource, e.g., 114a, is distinct from the others 114b, 114c and therefore, a user 100a generally is unable to locate resources 114a-114c related to any given resource, e.g., 114a.

To address this problem, according to a preferred embodiment of the present invention, the server 104 includes a resource management system ("RMS") 200. The RMS 200 allows the user 100a to select or configure relationships between a given resource, e.g., 114a, and one or more related resources 114b, 114c via a user interface (not shown). In particular, the RMS 200 allows the user 100a to create a matching criteria for the given resource 114a. The matching criteria includes one or more constraints that define the characteristics sought in the related resources, and can also include context constraints not related to the resources, e.g., constraints related to when and for whom the matching criteria can be executed. Upon request or at a scheduled time, the RMS 200 locates and returns links to resources 114b, 114c satisfying the matching criteria.

While the above described embodiment depicts a client-server environment, those skilled in the art appreciate that the present invention can be implemented in other system environments. For example, the present invention can be implemented in a peer-to-peer file sharing environment where instances of the RMS 200 are executed locally at one or more users 100a, 100b. Such environments would be well within the scope of the present invention.

Figure 2:
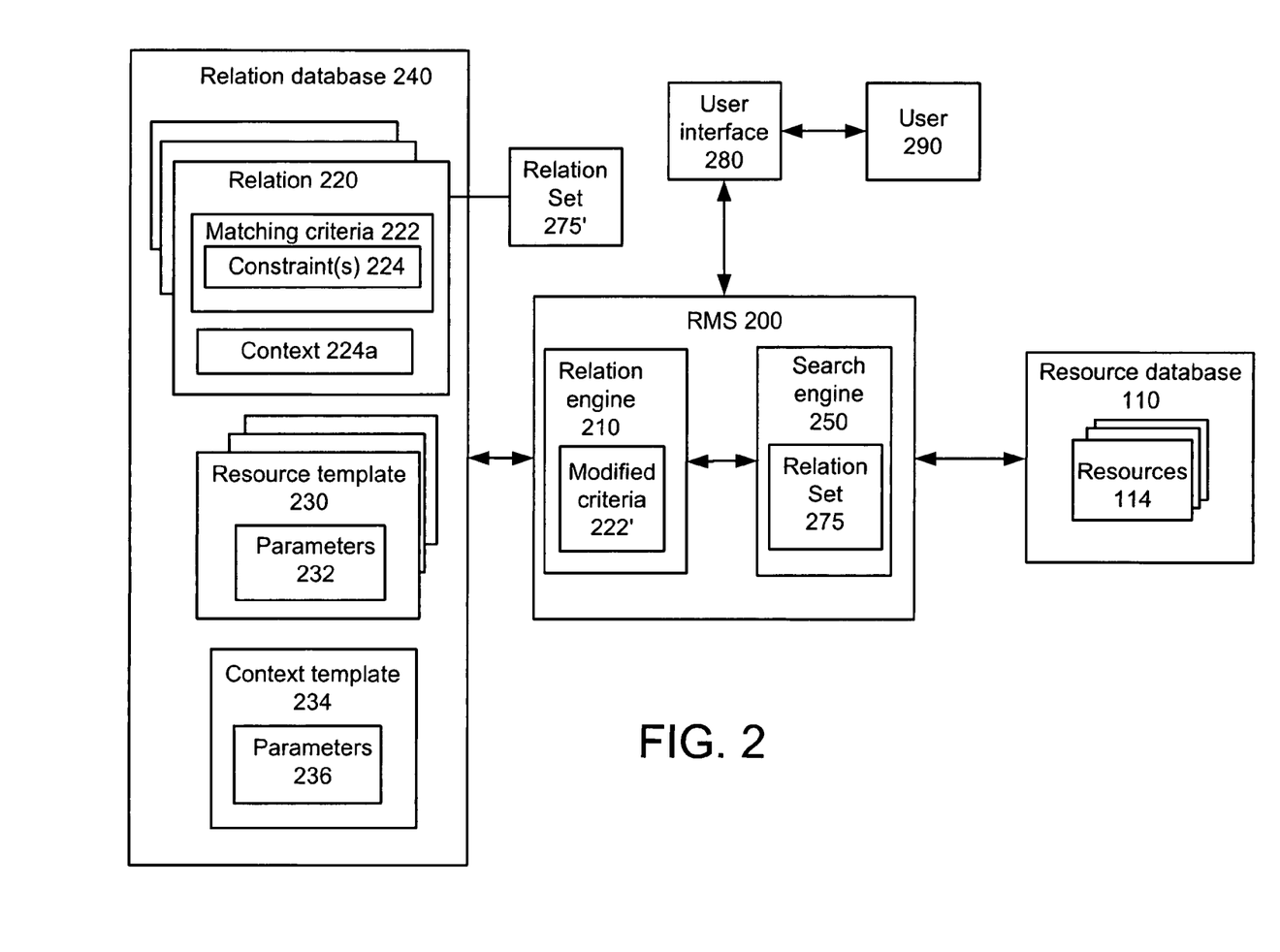
FIG. 2 is a block diagram depicting the RMS in more detail according to a preferred embodiment of the present invention.

FIG. 2 is a block diagram depicting the RMS 200 in more detail according to a preferred embodiment of the present invention. The RMS 200 includes a relation engine 210 for creating and updating relations 220 between resources 114. A relation database 240 coupled to the RMS 200 stores a plurality of relations 220, a plurality of resource templates 230 and a context template 234.

The relation engine 210 manages the relations 220 and the resource templates 230. Each relation 220 is associated with a resource 114 and each resource template 230 corresponds to a resource type. Thus, for example, an "image" resource type and a "song" resource type will each have a corresponding resource template 230. The resource template 230 for a particular resource type defines a plurality of fields or parameters 232 that characterize the resource type. For example, parameters 232 that characterize an "image" resource type might include Owner Name, Group Affiliation, Format, Image Name, Date Created, etc. Each parameter 232 is associated with a list of values from which the user 100a may select.

The relation engine 210 also manages the context template 234, which defines context parameters 236 that pertain to other conditions that are not necessarily related to the resource types. For example, the context parameters 236 can be related to an execution schedule, i.e., when a relation 220 can be executed, or to security measures, i.e., who can request such an execution.

The resource templates 230 and context template 234 are used to create and/or update a relation 220 between a specified resource and related resources via a user interface 280. Each relation 220 includes a matching criteria 222 comprising at least one constraint 224. Each constraint 224 is defined by one or more resource parameters 232 and one or more operators. In a preferred embodiment, the matching criteria 222 for a relation 220 is essentially a query against the database 110 where the resources are stored. The relation 220 can also include a context constraint 224a defined by one or more context parameters 236. The matching criteria 222 will be executed only when the context constraint 224a is satisfied.

Figure 3:
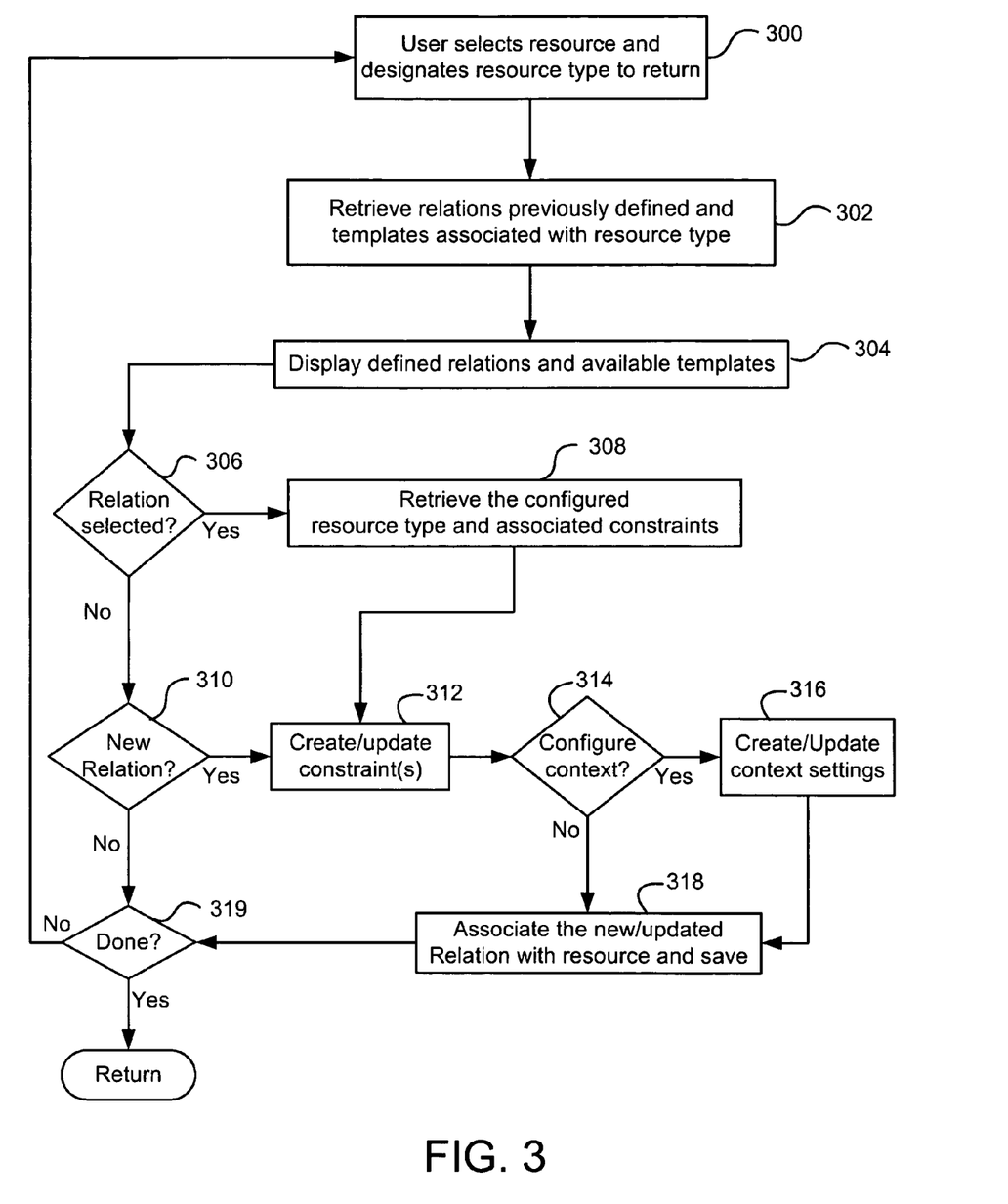
FIG. 3 is a flowchart illustrating a method for creating or updating a relation according to a preferred embodiment of the present invention.

FIG. 3 is a flowchart illustrating a method for creating or updating a relation 220 according to a preferred embodiment of the present invention. Referring to FIGS. 2 and 3, the process begins at step 300 when the user 290 selects, via the user interface 280, a resource 114 for which a relation 220 is to be configured and designates the type(s) of resource he or she wants returned. For example, the user 290 selects an album named Bridge Club Holiday Party and wants the RMS 200 to return images (resource type) and/or albums (resource type) satisfying the matching criteria 222. Upon receiving the selections, the RMS 200 calls the relation engine 210, which automatically retrieves any relations 220 previously defined for the selected resource 114 and retrieves the resource template 230 associated with the designated resource type in step 302. In step 304, the retrieved relations 220 and retrieved resource template 230 are displayed to the user 290 on the user interface 280.

Figure 4:
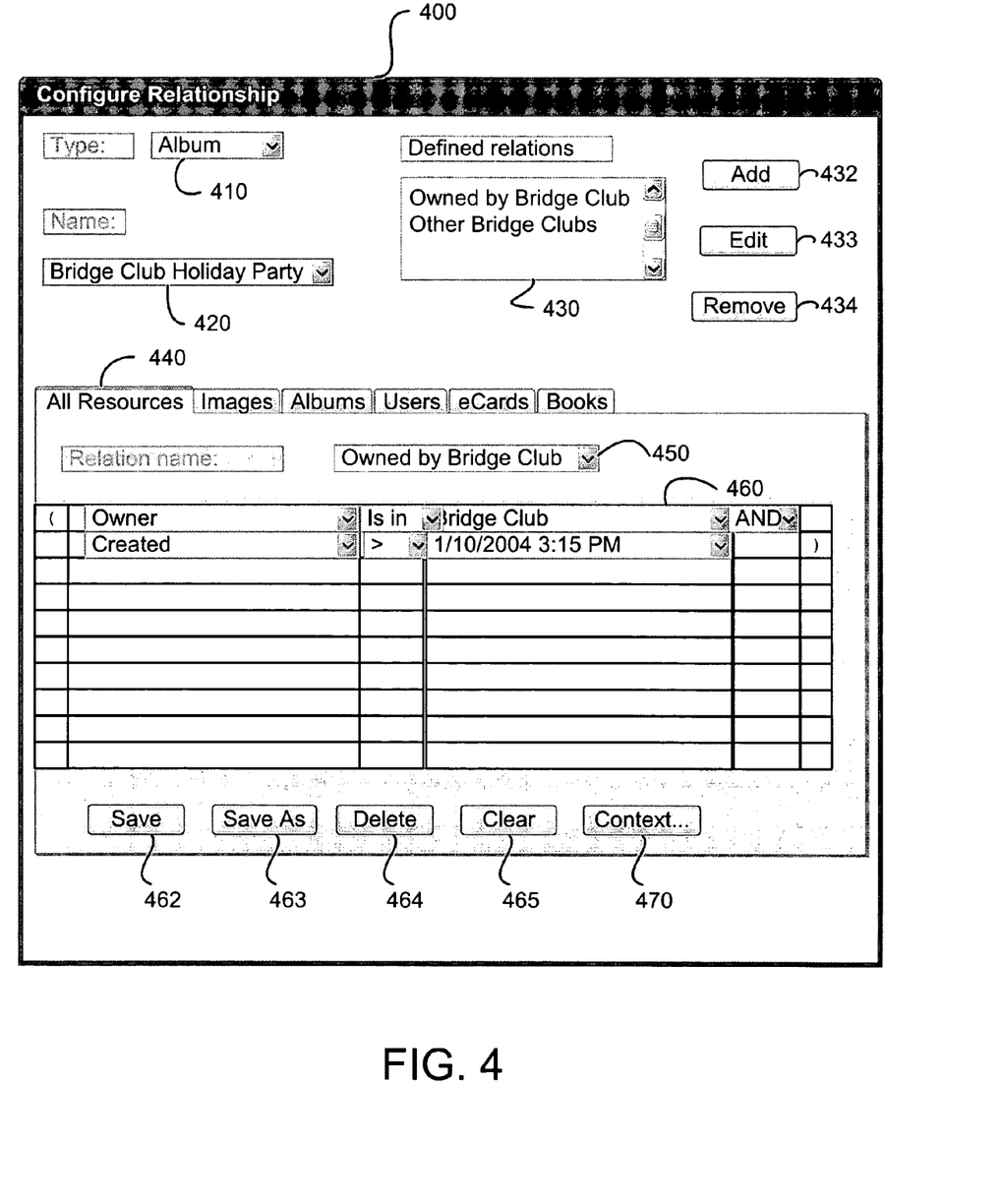
FIG. 4 illustrates an exemplary window displayed on a user interface during a relationship configuration mode according to a preferred embodiment of the present invention.

FIG. 4 illustrates an exemplary configuration window 400 displayed to a user 290 on the user interface 280 during a relationship configuration function according to a preferred embodiment of the present invention. Here, the user 290 has selected the album (resource type 410) entitled "Bridge Club Holiday Party" (resource name 420) to be configured. Note that the resource type 410 and the resource name 420 can be drop down menus that display the names of resources 114 controlled by the user 290 by resource type 410. The retrieved relations 220 that were previously defined are displayed in defined relations field 430. In this example, two relations 220 named "Owned by Bridge Club" and "Other Bridge Clubs" have been previously configured.

Referring again to FIG. 3, if the user 290 selects a previously defined relation 220 (step 306), the relation engine 210 automatically retrieves and displays the resource type and constraints 224 associated with the previously defined relation 220 in step 308. For example, in FIG. 4, the user 290 has selected a previously defined relation 220 by clicking on "Owned by Bridge Club" 430 and clicking on an "Edit" button 433. The configuration window 400 displays the resource type 440 associated with this relation 430 as "All Resources." The constraints 224 making up the matching criteria 222 for the relation 430 are displayed in a constraint window 460. As is shown, the "Owned by Bridge Club" relation 430 defines a matching criteria 222 that seeks "All Resources" satisfying two constraints 224:

1) Where the "Owner" of the resource "Is In" the "Bridge Club" and
2) Where the resource was "Created" after "Jan. 10, 2004 3:15 PM"

Referring again to FIG. 3, after the resource type and constraints associated with the relation 220 are displayed, the user 290 may update the constraints 224 in step 312 by modifying existing constraints or adding new constraints. If the user 290 does not select a previously defined relation (step 306) and decides to add a new relation (step 310), the user 290 creates constraints 224 (step 312) using the resource parameters 232 in the resource template 230 associated with the resource type in step 312.

Figure 4A:
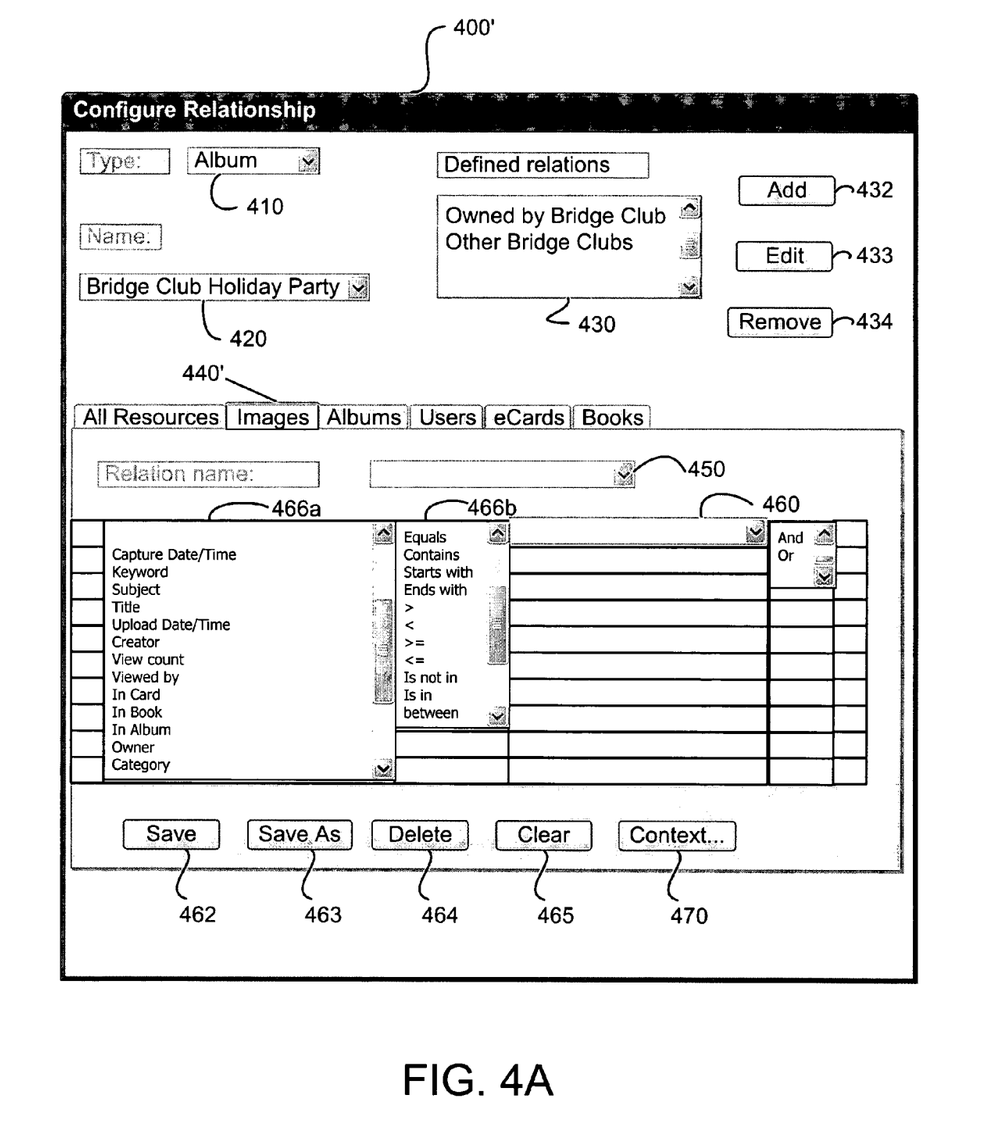
FIG. 4A illustrates an exemplary configuration window displayed to the user according to a preferred embodiment of the present invention.

FIG. 4A illustrates an exemplary configuration window 400' displayed to the user 290 when the user 290 is configuring a new relation 220. In this example, the user 290 has clicked on the "Add" button 432 and selected the resource type "Images" 440' to be returned. The constraint window 460 displays drop-down menus 466a, 466b that include the parameters 232 in the resource template 230 associated with the resource type "Images," as well as operators for building the matching criteria 222. For example, the values displayed in the first drop-down menu 466a list parameters 232 relevant to image searches. In a preferred embodiment, the values in one or more subsequent drop-down menus 466b are dependent on selected value in the first drop-down menu 466a. Those skilled in the art readily appreciate that drop-down menus 466a, 466b are usually displayed one at a time and that FIG. 4A illustrates two drop-down menus for discussion purposes only.

Referring again to FIG. 3, if the user 290 wishes to configure, i.e., create or update, context constraints 224a (step 314), the relation engine 210 automatically retrieves the context template 234 and allows the user 290 to create or update the context constraints 224a using the context parameters 236 in the context template 234 (step 316). For example, referring again to FIG. 4 or FIG. 4A, the user 290 clicks on a Context button 470 in the configuration window 400, 400' and a context configuration window automatically is displayed to the user 290.

Figure 4B:
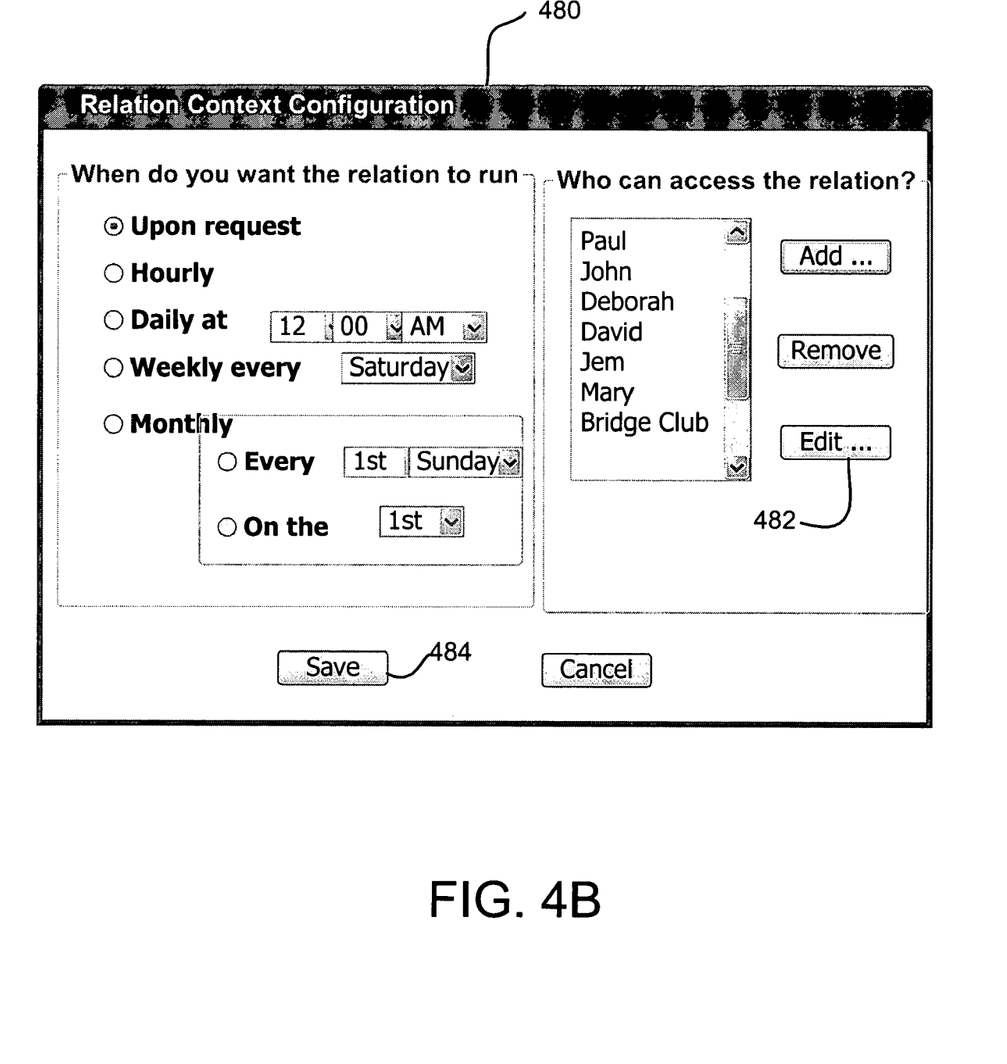
FIG. 4B is an exemplary context configuration window displayed on a user interface according to a preferred embodiment of the present invention.

FIG. 4B is an exemplary context configuration window 480 according to a preferred embodiment of the present invention. As is shown, the user 290 is allowed to configure the context constraint 224a to control when the relation is run and to control who can access the relation. In a preferred embodiment, the user 290 is allowed to customize another person's access to the relation. For example, the user 290 can choose "David" from the list of potential people who have access and click on an "Edit" button 482 to limit David's access to Saturdays only. Once the user 290 is satisfied with the context constraint 224a, the user 290 clicks on the "Save" button 484, and the context constraint 224a is automatically associated with the relation 220. The user 290 is then returned to the configuration window 400, 400.'

Referring again to FIG. 3, once the user 290 has finished configuring the relationship, the relation engine 210 automatically associates the new or updated relation 220 with the selected resource 114 and stores the relation 220 in the relation database 240 (step 318). If the user 290 is done creating or updating relations 220 (step 319), the configuration process ends and the RMS 200 waits for another request to configure a relation 220 or for a request to get links to resources 114 based on a relation 220.

Figure 3A:
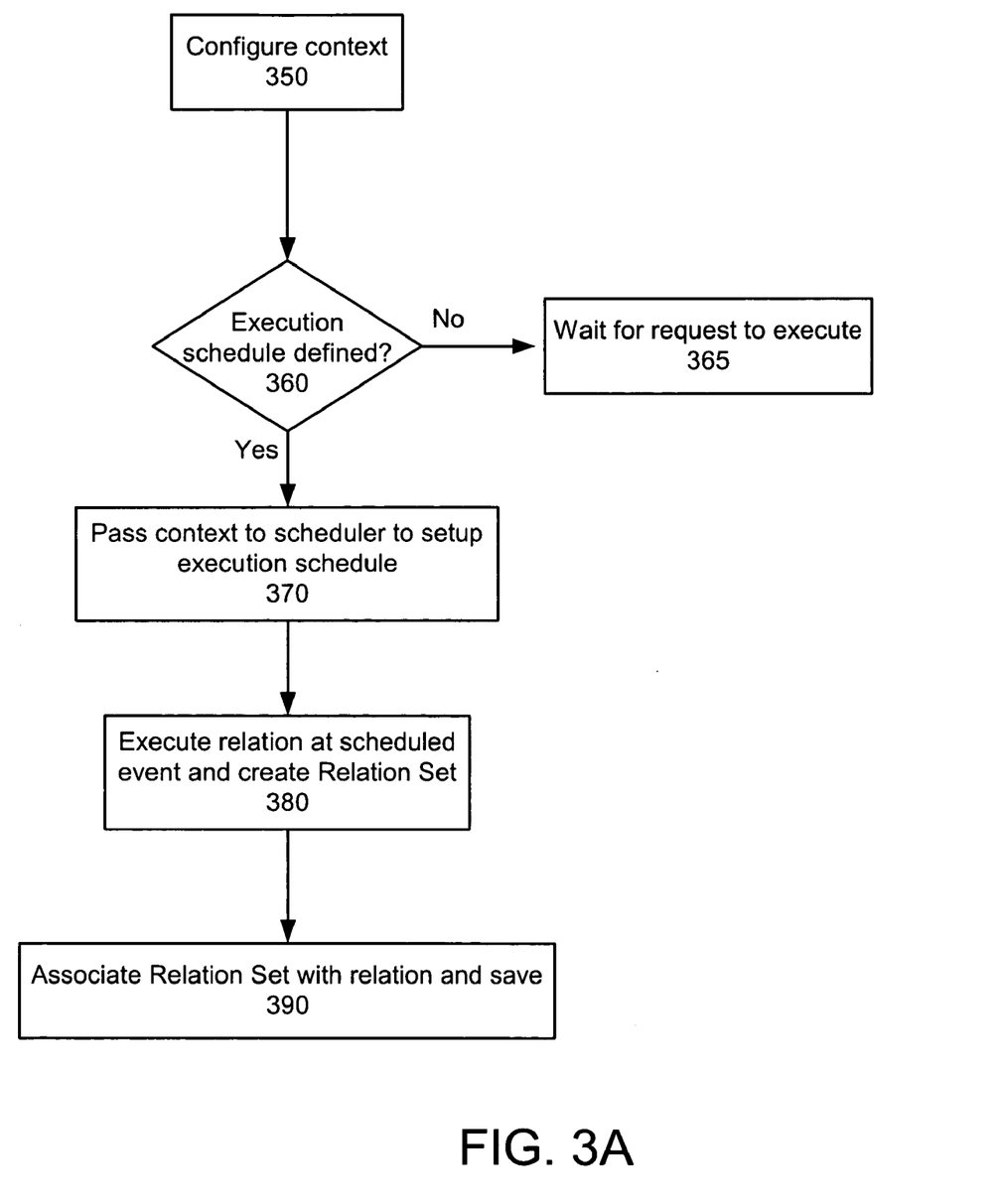
FIG. 3A is a flowchart illustrating a process for executing a relation.

As described above, the user 290 is allowed to configure a context constraint 224a using the context parameters 236. The context parameters 236 can be related to an execution schedule or to security restrictions. Thus, the context constraint 224a can control when a relation is executed and who can request such a search, for example. FIG. 3A is a flowchart illustrating a process for executing a relation if the context constraint 224a includes an execution schedule according to a preferred embodiment of the present invention.

Referring to FIGS. 2 and 3A, the context constraint 224a associated with the relation 220 is configured by the user (step 350). If the context constraint 224a includes an execution schedule (step 360), the context constraint 224a is passed to a scheduler to setup an execution schedule for the relation 220 (step 370). Schedulers are well known to those skilled in the art and further elaboration is unnecessary. The RMS 200 executes the relation 220 at a scheduled event defined by the execution schedule, e.g., at midnight and at noon, and creates a Relation Set 275 (step 380). The Relation Set 275' is then associated with the relation 220 and stored with the relation 220 in the relation database 240 (step 390). If the context constraint 224a does not include an execution schedule (step 360), the RMS 200 waits for a request to execute the relation 220 (step 365).

The stored Relation Set 275' is replaced whenever the relation 220 is executed so that the stored Relation Set 275' is the most recent one created at all times. Utilization of the stored Relation Set 275' will be described below.

Figure 5:
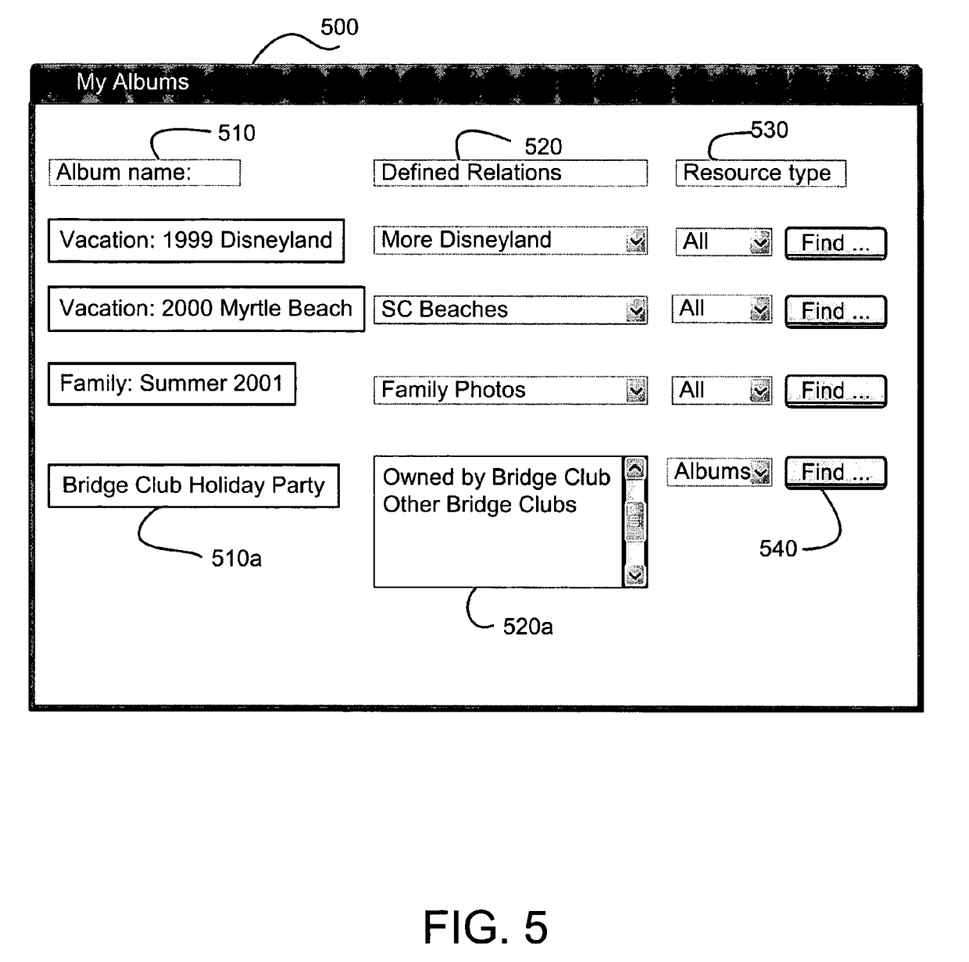
FIG. 5 is an exemplary window displayed to a user when the user accesses albums controlled by the user according to a preferred embodiment of the present invention.

According to the preferred embodiment of the present invention, when a user 290 visits the photo-sharing website or user website to access or view a resource 114, either as an owner of the resource 114 or as an invitee, the RMS 200 automatically displays any relations 220 associated with the resource 114. FIG. 5 is an exemplary window 500 displayed to the user 290 when the user 290 accesses albums controlled by the user 290 according to a preferred embodiment of the present invention. The window 500 displays the names of the albums 510, and, for each album 510, the names of any defined relations 520. For example, the Bridge Club Holiday Party album 510a (from FIG. 4) is displayed and the defined relations 520a are "Owned by Bridge Club" and "Other Bridge Clubs."

From this window 500, the user 290 is allowed to select a defined relation 520 and to submit a request to the RMS 200 to retrieve links to resources 114 satisfying the selected relation 520 by clicking a "Find" button 540 for example. Moreover, according to the preferred embodiment of the present invention, the RMS 200 allows the user 290 to add constraints to those already defined in the relation 220 in order to further limit the returned resources. For example, the window 500 includes a Resource Type field 530, where the user 290 can limit the type of resource to be returned. While the window illustrated in FIG. 5 only allows the user 290 to select the resource type returned, other constraints can also be offered to the user 290 that are not shown. For example, the user 290 might be allowed to designate a different creation date, or the user 290 might be allowed to add a constraint relating to particular owners. In a preferred embodiment, the user 290 is only allowed to add constraints that narrow the matching criteria 222, i.e., the user 290 is not allowed to broaden the scope of the defined relation 220.

Figure 6:
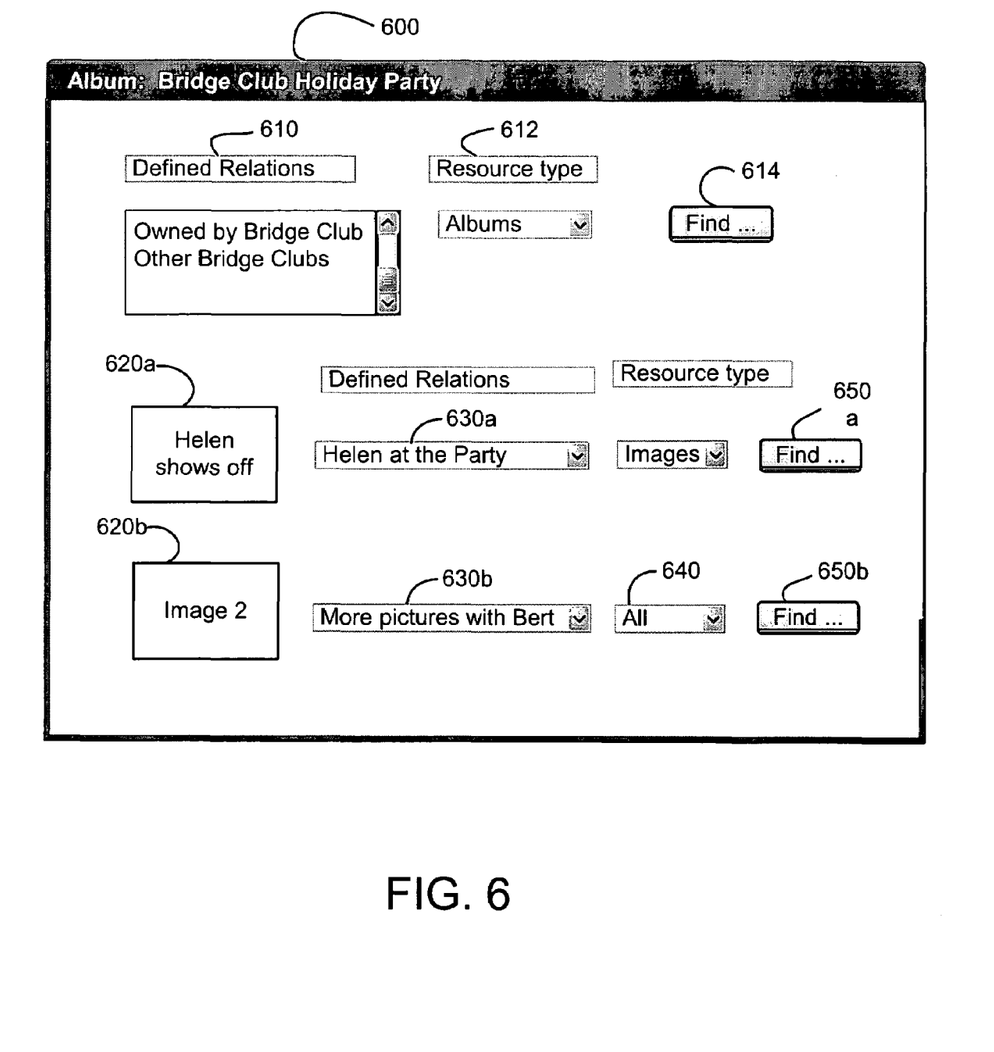
FIG. 6 is an exemplary window that is displayed to a user who has been invited to view an album controlled by another user according to a preferred embodiment of the present invention.

FIG. 6 is another exemplary window 600 that is displayed to the user 290 who has been invited to view an album controlled by another party. This window 600 can also be displayed to the controlling user 290 when the user 290 opens an album from, for example, the window 500 in FIG. 5. Here, the user 290 has been invited to view the Bridge Club Holiday Party album and has been provided the link, e.g., URL, to the album. The window 600 includes the names of defined relations 610 associated with the album, the Resource Type field 612 and the Find button 614, which are described above. The window 600 also includes images 620a, 620b that are in the album and the names of defined relations 630a, 630b that are associated with the images 620a, 620b. From this window 600, the user 290 is allowed to select a defined relation, 610 or 630a, 630b, to add a narrowing constraint, and to submit a request to the RMS 200 to retrieve links to resources 114 satisfying the selected relation 610 or 630a, 630b and additional narrowing constraint.

Figure 7:
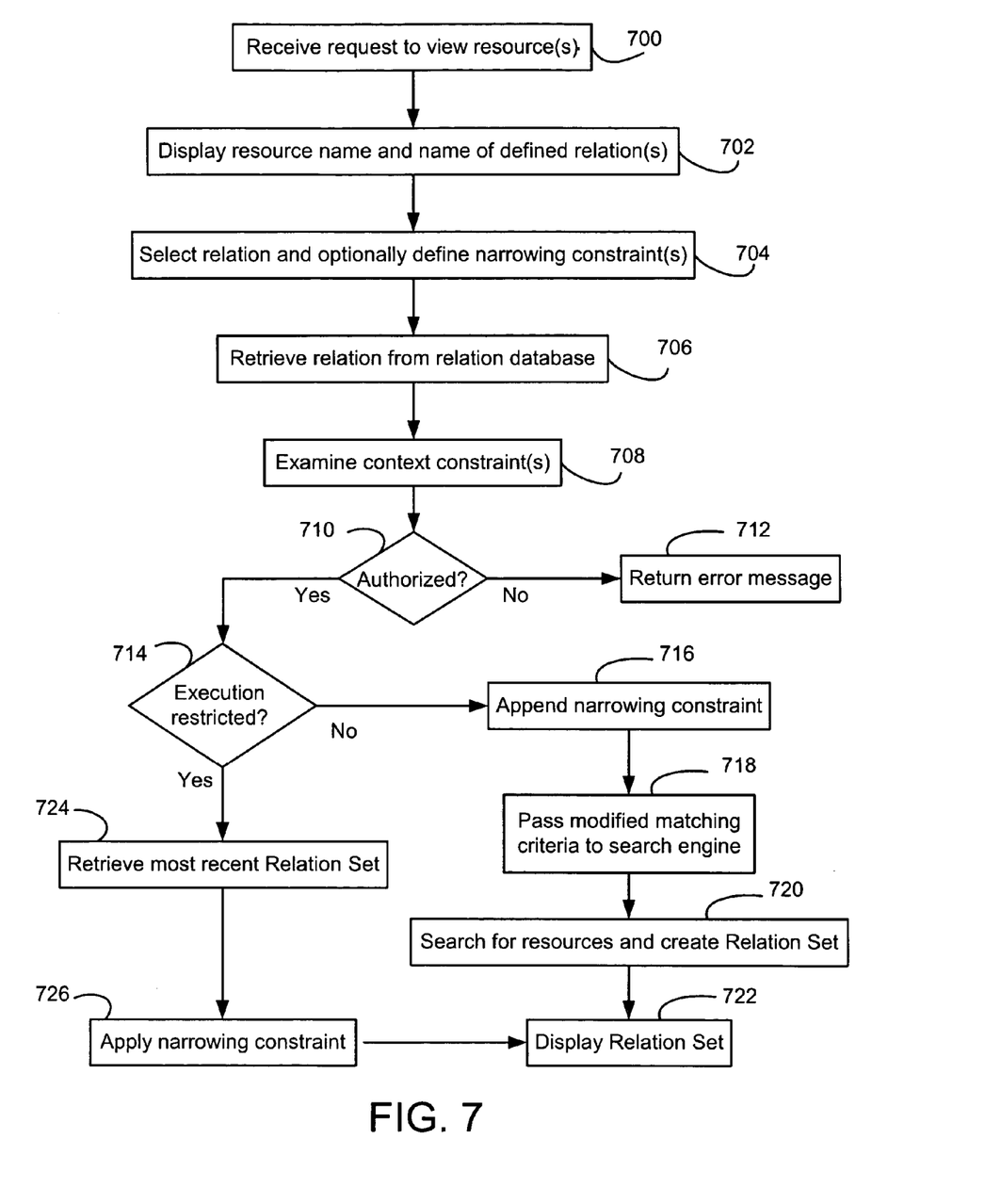
FIG. 7 is a flowchart illustrating a method for utilizing the RMS to retrieve links to related resources according to a preferred embodiment of the present invention.

FIG. 7 is a flowchart illustrating a method for utilizing the RMS 200 to retrieve links to resources 114 according to a preferred embodiment of the present invention. Referring again to FIGS. 2 and 7, the process begins at step 700 when the RMS 200 receives a request to view a group of resources 114, e.g., all albums, or one resource 114, e.g., a particular album. In step 702, the RMS 200 displays to the requestor, e.g., user 290, the name(s) of the requested resource(s) 510 and the names of the defined relations 520, 612, 630a, 630b associated therewith, as depicted in FIG. 5 or 6. In step 704, the requestor 290 selects a relation 220 for a resource 114 and optionally defines narrowing constraints.

Once the RMS 200 receives the selected relation 220, the RMS 200 calls the relation engine 210 to retrieve the selected relation 220 from the relation database 240 (step 706). The relation engine 210 then examines any context constraints 224a associated with the selected relation 220 (step 708) to determine whether the requester 290 is authorized to request the selected relation 220 and whether other context constraints 224a not related to the search for related resources are satisfied. If the requester 290 is not authorized (step 710) or if the other constraints 224a are not satisfied, an error message is returned to the requestor 290 (step 712). If the requestor 290 is authorized and the other constraints 224a are satisfied, then the search for the related resources 114 can proceed, i.e., the matching criteria 222 can be executed.

Next, the relation engine 210 determines whether a context constraint 224a for the selected relation 220 includes an execution schedule that defines when the matching criteria 222 can be executed, e.g., once a day at midnight or upon request. If the matching criteria 222 can be executed upon request, i.e., execution is not restricted (step 714), then the relation engine 210 appends the requestor's narrowing constraints, if any, to the matching criteria 222 (step 716), thereby forming a modified matching criteria 222'. The modified matching criteria 222' is passed to a search engine 250 coupled to the RMS 200 (step 718), which then searches for resources 114 that satisfy the modified matching criteria 222' and creates a Relation Set 275 comprising links to those resources (step 720). The Relation Set 275 is returned to the requestor (step 722).

If the matching criteria 222 is not executed upon request, i.e., the execution is restricted by an execution schedule (step 714), then the relation engine 210 retrieves from the relation database 240 the most recent Relation Set 275' created during a most recent search (step 724), and then applies the requestor's narrowing constraints to further filter the results (step 726). The filtered Relation Set 275' is then returned to the requestor (step 722). Utilizing the links in the Relation Set 275, 275', the requestor 290 is allowed to navigate to the resources that satisfied the matching criteria 222 defined by the relation 220.

Figure 8:
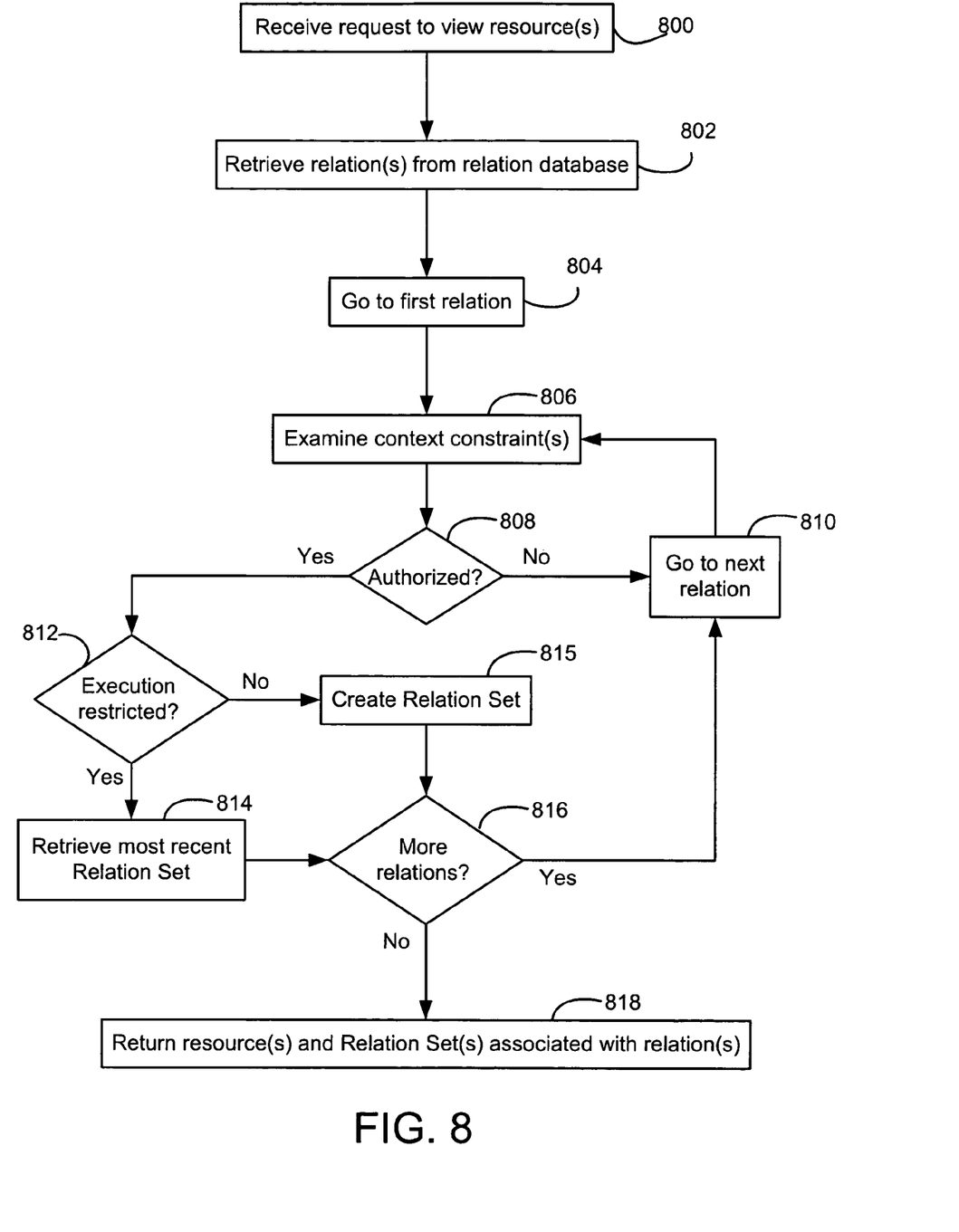
FIG. 8 is a flowchart illustrating a second preferred embodiment for utilizing the RMS to retrieve links to resources.

FIG. 8 is a flowchart illustrating another method for utilizing the RMS 200 to retrieve links to resources 114 according to another preferred embodiment of the present invention. Here, as before, the process begins when the RMS 200 receives a request to view a group of resources 114, e.g., all albums, or one resource 114, e.g., a particular album (step 800). In response, the RMS 200 automatically calls the relation engine 210 to retrieve the associated relation(s) 220 from the relation database 240 (step 802). Starting with a first relation 220 (step 804), the relation engine 210 then examines any context constraints 224a associated with the relation 220 (step 806) to determine whether the requestor 290 is authorized to request the relation 220 and whether other context constraints 224a not related to the search for related resources are satisfied. If the requester 290 is not authorized (step 808) or if the other constraints 224a are not satisfied, the RMS 200 skips to a next relation 220, if one exists (step 810).

Otherwise, if the requestor 290 is authorized and the other constraints 224a are satisfied, then the relation engine 210 determines whether a context constraint 224a for the selected relation 220 includes an execution schedule (step 812). If the context constraint 224a does not have an execution schedule, a Relation Set is created (step 815) by the process described in steps 718 to 720 in FIG. 7. Otherwise, the relation engine 210 retrieves from the relation database 240 the most recent Relation Set 275' created during a most recent search (step 814). If more relations 220 exist (step 816), the RMS 200 goes to the next relation 220 (step 810), and steps 806 through 815 are repeated for the next relation 220. After all relations 220 for the resource 114 have been processed (step 816), the RMS 200 displays to the requestor 290 the resource 114 and Relation Sets 275, 275' associated with the relations 220 for the resource 114 (step 818).

Figure 9:
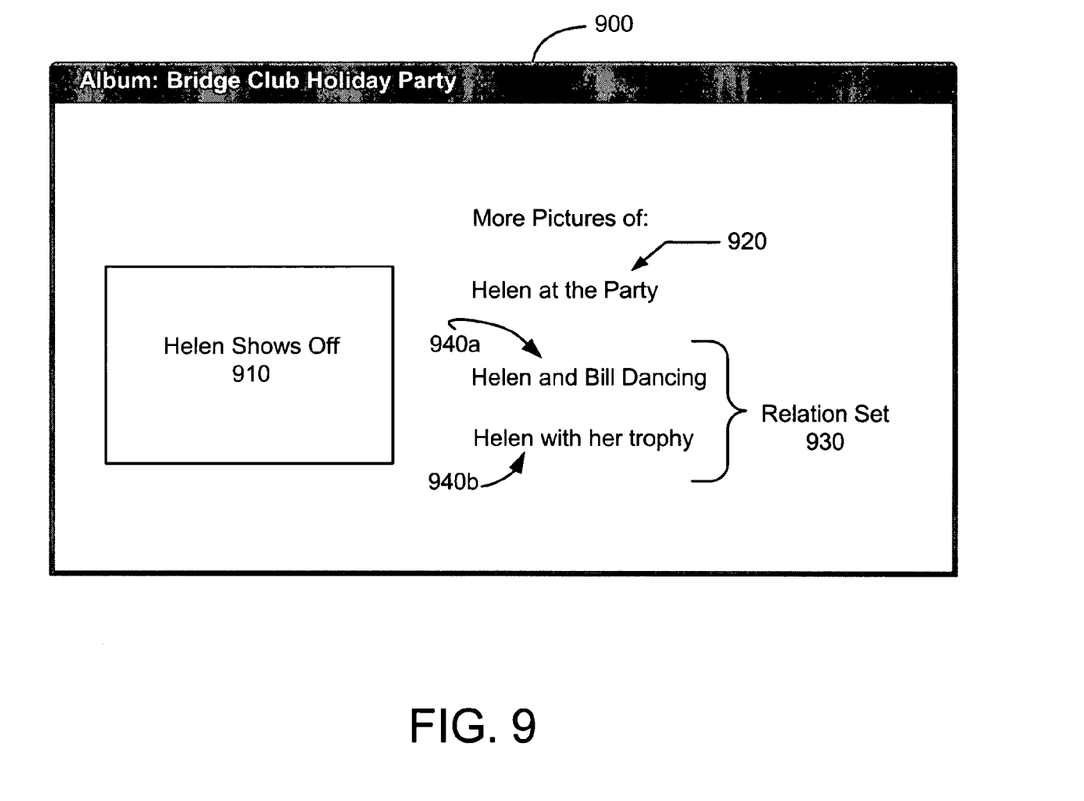
FIG. 9 is an exemplary Relation Set window that is displayed to the requestor according to a preferred embodiment of the present invention.

FIG. 9 is an exemplary window 900 displayed to the requestor 290 that includes a Relation Set for a relation 220 associated with a resource 114. According to the preferred embodiment, the window 900 displays the specified resource 910, the selected defined relation 920 and the Relation Set 930 for the defined relation 920. The Relation Set 930 includes the one or more links 940a, 940b to related resources. The requestor 290 navigates to the related resources 114 by selecting the corresponding link 940a, 940b.

In this particular example, the window 900 in FIG. 9 is displayed to the requestor 290 when the requestor 290 selects, via the window 600 in FIG. 6, the defined relation "Helen at the Party" 630a, which is associated with the image resource "Helen Shows Off" 620a, and clicks on the "Find" button 650a. In the alternative embodiment, the window 900 in FIG. 9 is displayed immediately to the requestor 290 when the requestor 290 accesses the image resource "Helen Shows Off" 620a. Referring to FIG. 9, the Relation Set 930 includes a link to an image entitled, "Helen and Bill Dancing" 940a and to an image entitled, "Helen with her trophy" 940b. By clicking on either of the links 940a, 940b, the requestor 290 can navigate immediately to the corresponding image.

Through aspects of the preferred embodiment of the present invention, the user is allowed to automatically discover and manually specify relationships among resources, e.g., images, albums, and users, which enables a site to provide links to related resources. Unlike conventional applications, the present invention provides great flexibility to the user in defining the types of relationships between a specified resource and the related resources. The user is not limited to static categories defined by the system, but rather is free to create constraints from parameters associated with the types of resources sought. By allowing the user to control the complexity and contour of the relationship, a variety of dynamic webs of related resources can be created and navigated.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A computer-implemented method for providing links to one or more resources related to a specified resource comprising:
   allowing for specifying a media resource for which a relation is to be configured, wherein the media resource is a distinct, categorizable media object associated with a resource type and stored in a data store;
   allowing for configuring the relation comprising a matching criteria for the specified media resource;
   associating the relation with the specified media resource;
   processing the relation to create a relation set comprising the links to the one or more related resources satisfying the matching criteria and;
   providing for presenting a visual representation of the media resource and a selectable visual representation of the relation for accessing a link included in the relation set.

2. The method of claim 1, wherein allowing for configuring the relation includes:
   allowing for selection of a resource type to be returned;
   in response to the selection, retrieving automatically a template corresponding to the resource type, wherein the template comprises a plurality of parameters associated with the corresponding resource type; and
   allowing for creating the matching criteria utilizing the plurality of parameters, wherein the one or more related resources satisfy the matching criteria.

3. The method of claim 2, wherein allowing for configuring the relation further includes:
   in response to specifying the resource, automatically retrieving and displaying any previously defined relation;
   allowing for selecting a previously defined relation; and
   allowing for updating the matching criteria in the previously defined relation selected.

4. The method of claim 3, wherein the relation further comprises a context constraint that imposes conditions not related to the matching criteria.

5. The method of claim 4, wherein allowing for configuring the relation includes:
   retrieving automatically a context template comprising a plurality of context parameters; and
   allowing for at least one of creating and updating the context constraint utilizing the plurality of context parameters.

6. The method of claim 1 further comprising:
   storing the relation after it has been associated with the resource.

7. The method of claim 6, wherein processing the relation includes:
   allowing for requesting access the specified resource; and
   upon receiving such a request, automatically retrieving the relation associated with the specified resource.

8. The method of claim 7, wherein processing the relation further includes:
   using the relation as a query to automatically search for the one or more related resources satisfying the matching criteria; and
   collecting links for the one or more related resources to create the relation set.

9. The method of claim 7, wherein the relation further comprises a context constraint that imposes one or more conditions not related to the matching criteria, wherein the one or more conditions includes a security criteria.

10. The method of claim 9, wherein processing the relation further includes:
    examining the security criteria to determine whether submitting the relation is authorized; and
    returning an error message the submission is not authorized.

11. The method of claim 10, wherein processing the relation further includes:
    if the submission is authorized, examining the context constraint to determine whether the relation is executable upon request.

12. The method of claim 11, wherein processing the relation further includes:
    if the relation is executable upon request, using the relation as a query to automatically search for the one or more related resources satisfying the matching criteria; and
    collecting links for the one or more related resources to create the relation set.

13. The method of claim 11, wherein processing the relation further includes:
    if the relation is not executable upon request, retrieving automatically a relation set most recently created.

14. The method of claim 7, wherein processing the relation further includes:
   allowing for defining one or more narrowing constraints;
   appending the one or more narrowing constraints to the matching criteria to form a modified matching criteria; and
   searching automatically for the one or more related resources satisfying the modified matching criteria.

15. The method of claim 1 further comprising:
   associating the relation set to the relation and to the specified resource;
   displaying the relation set; and
   allowing for utilizing the links in the relation set to navigate from the specified resource to the one or more resources satisfying the matching criteria.

16. A computer readable medium containing program instructions for providing links to one or more resources related to a specified resource, comprising instructions for:
   allowing for specifying a media resource for which a relation is to be configured, wherein the media resource is a distinct, categorizable media object associated with a resource type and stored in a data store;
   allowing for configuring the relation comprising a matching criteria for the specified media resource;
   associating the relation with the specified media resource;
   processing the relation to create a relation set comprising the links to the one or more related resources satisfying the matching criteria and;
   providing for presenting a visual representation of the media resource and a selectable visual representation of the relation for accessing a link included in the relation set.

17. The computer readable medium of claim 16, wherein the configuring instruction includes:
   allowing for selecting a resource type to be returned;
   in response to the selection, retrieving automatically a template corresponding to the resource type, wherein the template comprises a plurality of parameters associated with the corresponding resource type; and
   allowing for creating the matching criteria utilizing the plurality of parameters, wherein the one or more related resources satisfy the matching criteria.

18. The computer readable medium of claim 17, wherein the configuring instruction further includes:
   in response to specifying the resource, automatically retrieving and displaying any previously defined relation;
   allowing for selecting a previously defined relation; and
   allowing for updating the matching criteria in the previously defined relation selected.

19. The computer readable medium of claim 18, wherein the relation further comprises a context constraint that imposes conditions not related to the matching criteria.

20. The computer readable medium of claim 19, wherein the configuring instruction includes:
   retrieving automatically a context template comprising a plurality of context parameters; and
   allowing for at least one of creating and updating the context constraint utilizing the plurality of context parameters.

21. The computer readable medium of claim 16 further comprising instructions for:
   storing the relation after it has been associated with the resource.

22. The computer readable medium of claim 21, wherein the processing instruction includes:
   allowing for requesting access to the specified resource; and
   upon receiving such a request, automatically retrieving the relation associated with the specified resource.

23. The computer readable medium of claim 22, wherein the processing instruction further includes:
   using the relation as a query to automatically search for the one or more related resources satisfying the matching criteria; and
   collecting links for the one or more related resources to create the relation set.

24. The computer readable medium of claim 22, wherein the relation further comprises a context constraint that imposes one or more conditions not related to the matching criteria, wherein the one or more conditions includes a security criteria.

25. The computer readable medium of claim 24, wherein the processing instruction further includes:
   examining the security criteria to determine whether submitting the relation is authorized; and
   returning an error message if the submission is not authorized.

26. The computer readable medium of claim 25, wherein the processing instruction further includes:
   if the submission is authorized, examining the context constraint to determine whether the relation is executable upon request.

27. The computer readable medium of claim 26, wherein the processing instruction further includes:
   if the relation is executable upon request, using the relation as a query to automatically search for the one or more related resources satisfying the matching criteria; and
   collecting links for the one or more related resources to create the relation set.

28. The computer readable medium of claim 26, wherein the processing instruction further includes:
   if the relation is not executable upon request, retrieving automatically a relation set most recently created.

29. The computer readable medium of claim 22, wherein the processing instruction further includes:
   allowing for defining one or more narrowing constraints;
   appending the one or more narrowing constraints to the matching criteria to form a modified matching criteria; and
   searching automatically for the one or more related resources satisfying the modified matching criteria.

30. The computer readable medium of claim 16 further comprising instructions for:
   associating the relation set to the relation and to the specified resource;
   displaying the relation set; and
   allowing for utilizing the links in the relation set to navigate from the specified resource to the one or more resources satisfying the matching criteria.

31. A system for providing links to one or more resources related to a specified resource comprising:
   a resource management system for allowing for specifying a media resource and to configure a relation comprising a matching criteria for the media resource, wherein the media resource is a distinct, categorizable media object associated with a resource type and stored in a data store;
   means for associating the relation to the specified media resource;
   means for storing the relation associated with the specified media resource in a relation database coupled to the resource management system;

a search engine coupled to the resource management system for processing the relation to create a relation set comprising the links to the one or more related resources satisfying the matching criteria; and means for presenting a visual representation of the media resource and a selectable visual representation of the relation for accessing a link included in the relation set.

32. The system of claim 31 further comprising:

a user interface coupled to the resource management system for allowing for selecting a resource type to be returned, wherein, the resource management system includes means for receiving the selection and a relation engine for retrieving from the relation database a template corresponding to the resource type, wherein the template comprises a plurality of parameters associated with the corresponding resource type.

33. The system of claim 32, wherein the resource management system further includes means for allowing for creating the matching criteria utilizing the plurality of parameters via the user interface, wherein the one or more related resources satisfy the matching criteria.

34. The system of claim 32, wherein the relation engine automatically retrieves and displays any previously defined relation for the resource in response to specifying the resource to be configured.

35. The system of claim 34, wherein the resource management system includes means for allowing for selecting a previously defined relation and allowing for updating the matching criteria in the previously defined relation selected.

36. The system of claim 34, wherein the relation further comprises a context constraint that imposes conditions not related to the matching criteria.

37. The system of claim 36, wherein the relation engine automatically retrieves from the relation database a context template comprising a plurality of context parameters and the resource management system includes means for allowing for at least one of creating and updating the context constraint utilizing the plurality of context parameters.

38. The system of claim 32, wherein the resource management system includes means for receiving the request to access the resource, and wherein the relation engine, in response to such a request, automatically retrieves the relation associated with the resource.

39. The system of claim 38, wherein the resource management system includes means for passing the matching criteria associated with the relation to the search engine for execution.

40. The system of claim 39, wherein the search engine includes means for locating the one or more related resources satisfying the matching criteria and means for collecting links for the one or more related resources to create the relation set.

41. The system of claim 39 wherein the relation further comprises a context constraint that imposes one or more conditions not related to the matching criteria, wherein the one or more conditions includes a security criteria.

42. The system of claim 41, wherein the resource management system includes means for examining the security criteria prior to passing the matching criteria to the search engine to determine whether submitting the relation is authorized and means for returning an error message if the submission is not authorized.

43. The system of claim 42, wherein the resource management system includes means for examining the context constraint to determine whether the relation is executable upon request and means for instructing the relation engine retrieve a relation set most recently created if the relation is not executable upon request.

44. The system of claim 38, wherein in response to the request to access the resource, the resource management system displays the relation associated with the resource via the user interface and wherein the resource management system further includes means for allowing for selecting the displayed relation, means for allowing for defining one or more narrowing constraints, means for appending the one or more narrowing constraints to the matching criteria to form a modified matching criteria, and means for passing the modified matching criteria to the search engine for execution.

45. The system of claim 31 further comprising means for allowing for utilizing the links in the relation set to navigate from the specified resource to the one or more resources satisfying the matching criteria.

46. A method for determining links between a specified resource and one or more related resources comprising:

allowing for specifying a image resource and to define a set of relationships associated with the specified image resource, wherein the image resource is at least one of an image object and a photo album object;

utilizing the set of relationships to determine the links associated with the one or more related resources; and displaying the links to allow navigation from the specified image resource to the one or more related resources by following the associated links.

47. A computer readable medium containing program instructions for determining links between a specified resource and one or more related resources comprising instructions for:

allowing for specifying a image resource and to define a set of relationships associated with the specified image resource, wherein the image resource is at least one of an image object and a photo album object;

utilizing the set of relationships to determine the links associated with the one or more related resources; and displaying the links to allow navigation from the specified image resource to the one or more related resources by following the associated links.

48. A system for determining links between a specified resource and one or more related resources comprising:

a resource management system including a user interface for allowing for specifying a image resource and to define a set of relationships associated with the specified image resource, wherein the image resource is at least one of an image object and a photo album object;

a search engine coupled to the resource management system for utilizing the set of relationships to determine the links associated with the one or more related resources; and means for displaying the links to allow navigation from the specified image resource to the one or more related resources by following the associated links.

* * * * *